(12) United States Patent
Correl et al.

(10) Patent No.: US 8,380,464 B2
(45) Date of Patent: Feb. 19, 2013

(54) MOVING PHYSICAL OBJECTS FROM ORIGINAL PHYSICAL SITE TO USER-SPECIFIED LOCATIONS AT DESTINATION PHYSICAL SITE

(75) Inventors: Stephen F. Correl, Portland, OR (US); Debora Velarde, Beaverton, OR (US); Brent W. Yardley, Hillsboro, OR (US); Pradeep Satyanarayana, Portland, OR (US); Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 12/172,243

(22) Filed: Jul. 13, 2008

(65) Prior Publication Data

US 2010/0010783 A1 Jan. 14, 2010

(51) Int. Cl.
*G06F 17/50* (2006.01)

(52) U.S. Cl. .......................................................... 703/1
(58) Field of Classification Search ....................... 703/1
See application file for complete search history.

(56) References Cited

U.S. PATENT DOCUMENTS

| | | | | |
|---|---|---|---|---|
| 5,964,298 A * | 10/1999 | Greenspun | ...................... | 172/4.5 |
| 6,332,098 B2 * | 12/2001 | Ross et al. | ..................... | 700/226 |
| 6,437,778 B1 | 8/2002 | Matsui et al. | | |
| 6,542,249 B1 * | 4/2003 | Kofman et al. | ................ | 356/601 |
| 6,727,925 B1 * | 4/2004 | Bourdelais | ..................... | 715/852 |
| 6,827,265 B2 * | 12/2004 | Knowles et al. | ......... | 235/462.01 |
| 7,080,096 B1 * | 7/2006 | Imamura | ................................ | 1/1 |
| 7,098,793 B2 * | 8/2006 | Chung | ....................... | 340/572.1 |
| 7,753,271 B2 * | 7/2010 | Skaaksrud et al. | ............ | 235/384 |
| 7,834,883 B2 * | 11/2010 | Adams | ........................... | 345/581 |
| 2002/0052755 A1 * | 5/2002 | Whatley et al. | .................... | 705/1 |
| 2005/0081161 A1 | 4/2005 | MacInnes et al. | | |
| 2005/0289590 A1 | 12/2005 | Cheok et al. | | |
| 2006/0091199 A1 * | 5/2006 | Loughran | ..................... | 235/376 |
| 2006/0106652 A1 | 5/2006 | Wamsley | | |
| 2007/0017998 A1 | 1/2007 | Sears | | |
| 2007/0190496 A1 | 8/2007 | Lamb | | |
| 2008/0084314 A1 * | 4/2008 | Dipiazza | .................... | 340/573.1 |

OTHER PUBLICATIONS

M. Ream, "Adding Value to RFID," Sep. 2005, accessed from Internet at www.zebra.com.
M. Goldstein, Review of CADPro 4, May 2005, accessed from Internet at www.kickstartnews.com.
J. Isdale, "3D Scanner Technology Review," Aug./Sep. 1998, accessed from Internet at vr.isdale.com.

* cited by examiner

*Primary Examiner* — Mary C Jacob
*Assistant Examiner* — Aniss Chad
(74) *Attorney, Agent, or Firm* — Steven L. Bennett (57) ABSTRACT

Dimensions of each physical object to be moved from an original physical site to a destination physical site are at least approximately determined. Each physical object is tagged with an identifier. A virtual layout of the destination physical site and the dimensions and the identifier of each physical object are input into a computer program. A user-specified location of where within the destination physical site each physical object is to be placed when moved to the destination physical site is input using the computer program, based on the virtual layout of the destination physical site and the dimensions and the identifier of each physical object. At the destination physical site, each physical object is looked up using the identifier of the physical object to determine the user-specified location of where to place the physical object within the destination physical site.

16 Claims, 5 Drawing Sheets

MOVING PHYSICAL OBJECTS FROM ORIGINAL PHYSICAL SITE TO USER-SPECIFIED LOCATIONS AT DESTINATION PHYSICAL SITE

FIELD OF THE INVENTION

The present invention relates generally to moving physical objects from an original physical site to a destination physical site, and more particularly to moving the physical objects to user-specified locations at the destination physical site.

BACKGROUND OF THE INVENTION

The moving process can be fraught with perils. On the day that physical objects are being moved from the existing location, it has to be ensured that all the objects are properly packed up and are loaded onto a moving truck, plane, boat, and/or train. On the day that the objects are unloaded at the new location, it has to be ensured that all the objects have made it to the new location, and that the movers have put them in their proper places at the new location. Sometimes, however, not all the objects make it to the new location, which may not be discovered until later, or the objects may not be put in their proper places at the new location, which can be counterproductive and costly.

SUMMARY OF THE INVENTION

A method of an embodiment of the invention at least approximately determines dimensions of each physical object to be moved from an original physical site to a destination physical site. Each physical object is tagged with an identifier. A virtual layout of the destination physical site and the dimensions and the identifier of each physical object are input into a computer program. A user-specified location of where within the destination physical site each physical object is to be placed when moved to the destination physical site is input using the computer program, based on the virtual layout of the destination physical site and the dimensions and the identifier of each physical object. At the destination physical site, each physical object is looked up using the identifier of the physical object to determine the user-specified location of where to place the physical object within the destination physical site.

A system of an embodiment of the invention includes hardware and one or more components implemented at least within the hardware. The components are to receive a virtual layout of a destination physical site to which a number of physical objects are to be moved from an original physical site. The components are further to receive dimensions and an identifier of each physical object. The components permit a user to input a user-specified location of where within the destination physical site each physical object is to be placed when moved to the destination physical site, based on the virtual layout of the destination physical site and the dimensions and the identifiers of the physical objects.

A handheld electronic device includes an input mechanism, a communication mechanism, and a display mechanism. The input mechanism is to input dimensions and an identifier of each physical object to be moved from an original physical site to a destination physical site. The communication mechanism is to electronically communicate the dimensions and the identifier to a system. The system permits a user to input a user-specified location of where within the destination physical site each physical object is to be placed when moved to the destination physical site, based on a virtual layout of the destination physical site and on the dimensions and the identifiers of the physical objects. The display mechanism is to display the user-specified location of where to place each physical object within the destination physical site after the handheld electronic device has looked up the physical object using the identifier of the physical object to determine the user-specified location.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
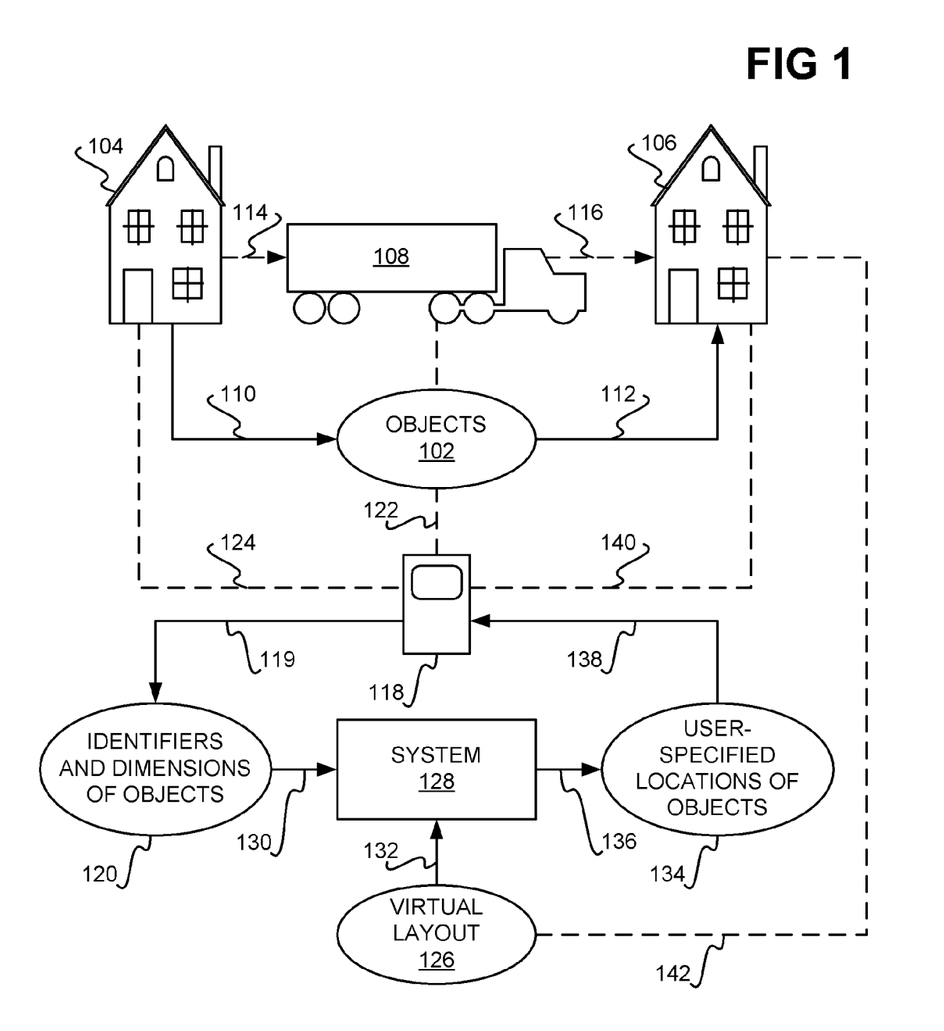
FIG. 1 is a diagram depicting exemplary operation of a representative embodiment of the present invention

FIG. 1 depicts the exemplary operation of a representative embodiment of the present invention. A number of physicals objects 102 are to be moved from an original physical site 104 to a destination physical site 106 as indicated by the arrows 110 and 112. The physical objects 102 may include furniture, boxes packed with items, vehicles, crates, machinery, equipment, and/or other types of physical objects. The physical sites 104 may be offices, buildings, military bases or other types of military sites, as well as houses, or other types of physical sites. Thus, the objects 102 in one embodiment belong to a larger organization such as a business or a branch of the government like the military. The physical objects 102 may be moved from the original physical site 104 to the destination physical site 106 via a physical transporter 108, as indicated by the dotted arrows 114 and 116. The physical transporter 108 may be one or more moving trucks. Other types of physical transporters include planes, trains, boats, and so on.

A handheld electronic device 118 is used at the original physical site 104, as indicated by the dotted line 124, in relation to the objects 102, as indicated by the dotted line 122, as follows. At least the approximate dimensions of each physical object 102 is determined by and/or input into the handheld electronic device 118, as is described in more detail later in the detailed description. The dimensions include at least a physical object's "footprint"—its width and its length—and may also include its height.

Each physical object 102 is also tagged with an identifier that is input into the handheld electronic device 118. The identifier in one embodiment uniquely identifies each physical object 102 as compared to all the other physical objects 102. Different types of identifiers and how the physical objects 102 are tagged with such identifiers are described later in the detailed description.

Once the dimensions and the identifiers 120 of the physical objects 102 have been input into the handheld electronic device 118, the handheld electronic device 118 communicates the dimensions and the identifiers 120 to a computing system 128, as indicated by the arrows 119 and 130. The computing system 128 may have one or more computer programs running on it. Besides the dimensions and the identifiers 120 of the physical objects 102, the computing system 128 also (as indicated by the arrow 132) inputs a virtual layout 126 of the destination physical site 106, where the dotted line 142 indicates that the virtual layout 126 is for the physical site 106.

The virtual layout 126 may be a computer-aided design (CAD) file specifying at least the floor plan of the destination physical site 106, or another type of virtual layout that specifies at least the floor plan of the physical site 106. For instance, a realtor may provide a floor plan of the destination physical site 106, and the information regarding the floor plan may be manually input into the computing system 128. The virtual layout 126 specifies at least the length, width, and relative locations of each room or other space at the destination physical site 106. The virtual layout 126 may also specify the height of each room or other space at the destination physical site 106.

A user, such as the user who is moving his or her residence from the original physical site 104 to the destination physical site 106 or who is otherwise responsible for coordinating the moving process, interacts with the computing system 128 to input user-specified locations 134 of the objects 102 at the physical site 106. For example, the computing system 128 may display the virtual layout 126 of the destination physical site 106 to the user, and a list of icons corresponding to the objects 102. The user may then be able to use a graphical user interface provided by the computing system 128 to move each icon to a desired location within the virtual layout 126. Once the user is satisfied with the placement of such icons, in this way the user specifies the locations 134 of where within the destination physical site 106 the physical objects 102 are to be placed when moved to the destination physical site 106.

The computing system 128 in one embodiment provides a simple two-dimensional floor plan of the virtual layout 126 of the destination physical site 106, as well as corresponding two-dimensional icons that correspond to the physical objects 102 and that have sizes in accordance with the actual or approximate length and width of the objects 102. Alternatively, the computing system 128 in another embodiment provides a more complex and rich three-dimensional virtual reality environment of the virtual layout 126 of the destination physical site 106. In this embodiment, the computing system 128 may also provide three-dimensional icons that correspond to the physical objects 102 and that have sizes in accordance with the actual or approximate length, width, and height of the objects 102.

In one embodiment, the user interacts with a virtual worlds environment, via the computing system 128, to input the user-specified locations 134 of the objects 102 of the physical site 106. A virtual worlds environment is a computer-based simulated environment intended for its users to inhabit and interact. The computer-simulated world presents perceptual stimuli to the user, who in turn may manipulate elements of the modeled world.

When the objects 102 have been transported to the destination physical site 106 by the physical transporter 108, the handheld electronic device 118 is again employed, as indicated by the dotted line 140. As the physical objects 102 are unloaded from the physical transporter 108, their identifiers are input into the handheld electronic device 118. The handheld electronic device 118 determines the user-specified locations 134 for the physical objects 102 by looking up the identifiers against the user-specified locations 134 that are provided to the electronic device 118, as indicated by the arrow 138. The handheld electronic device 118 then instructs the moving personnel where to place the physical objects 102 within the destination physical site 106. One manner by which the handheld electronic device 118 inputs the identifiers of the physical objects 102 and instructs the moving personnel where to place the physical objects 102 is described later in the detailed description.

The handheld electronic device 118 in one embodiment performs other functionality as well, which is described in more detail later in the detailed description. First, the handheld electronic device 118 in one embodiment is used to verify that all the objects 102 that were tagged with identifiers at the original physical site 104 have been moved to the destination physical site 106. Second, the electronic device 118 in one embodiment is used to verify that all the objects 102 have been correctly placed at their user-specified locations at the destination physical site 106. For example, it may be verified that master bedroom furniture has been placed in the master bedroom at the destination physical site 106, that office furniture has been placed in the den at the destination physical site 106, and so on.

Figure 2A:
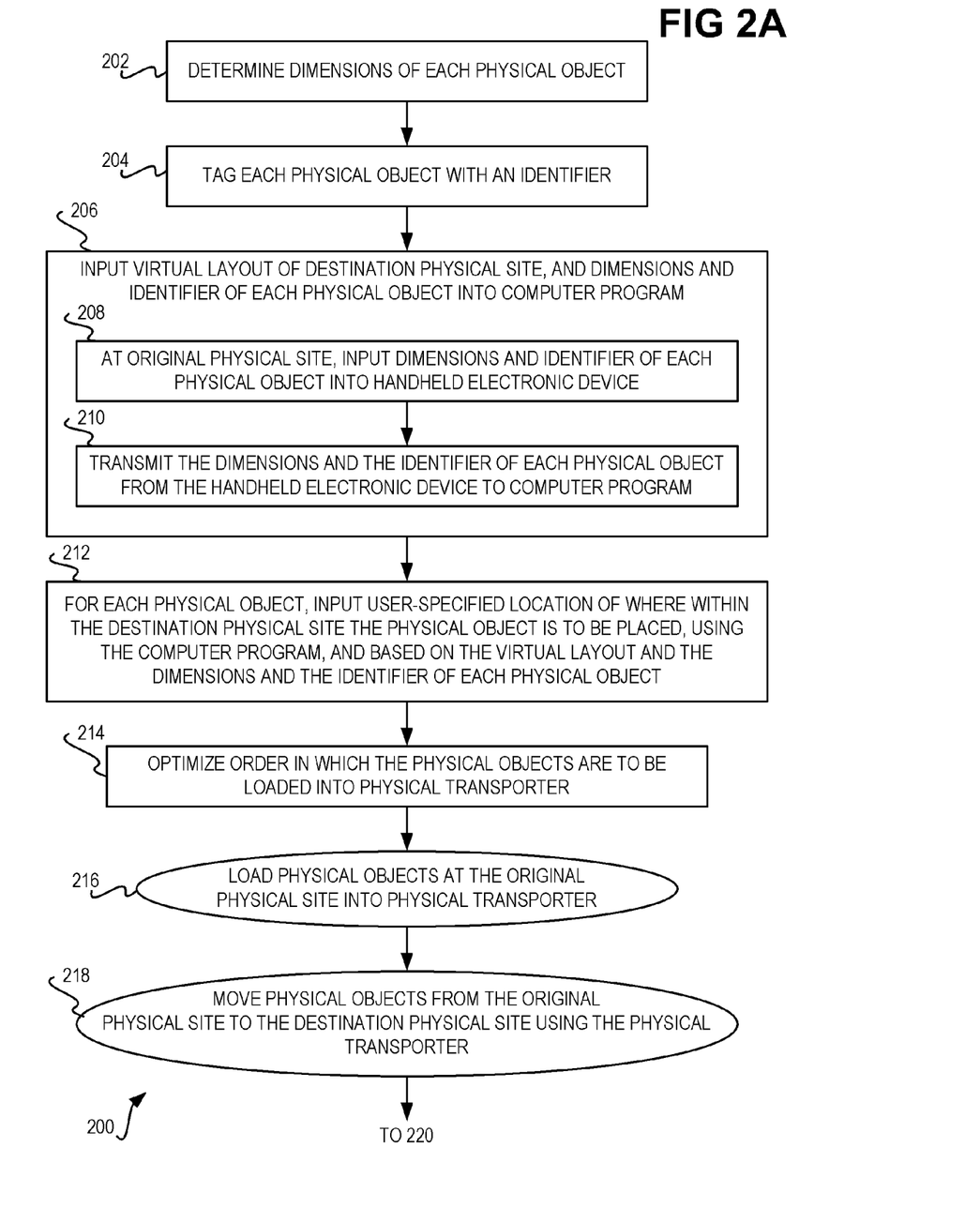
FIGS. 2A, 2B, and 2C are flowcharts of a method, according to an embodiment of the present invention.
Figure 2B:
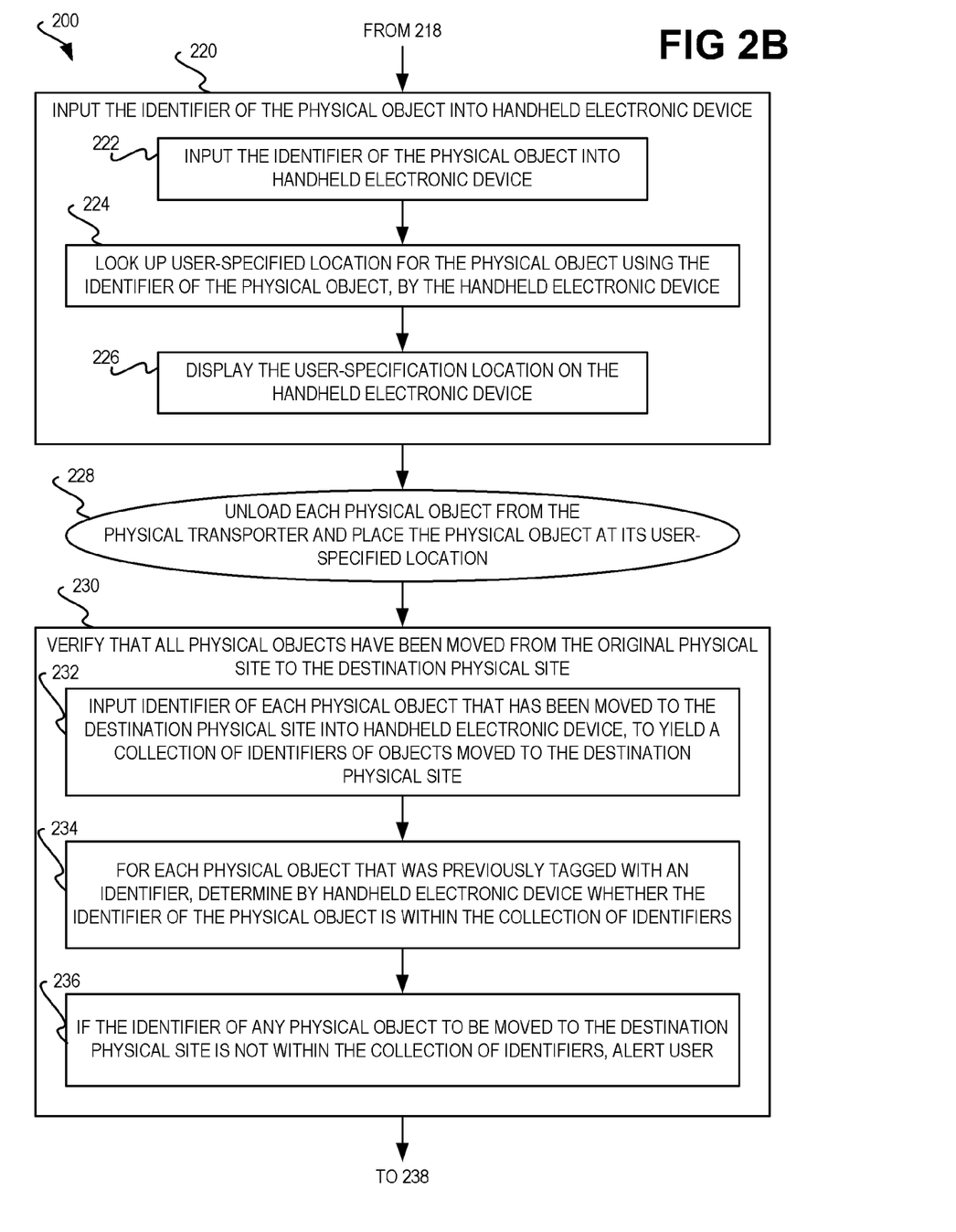
Figure 2C:
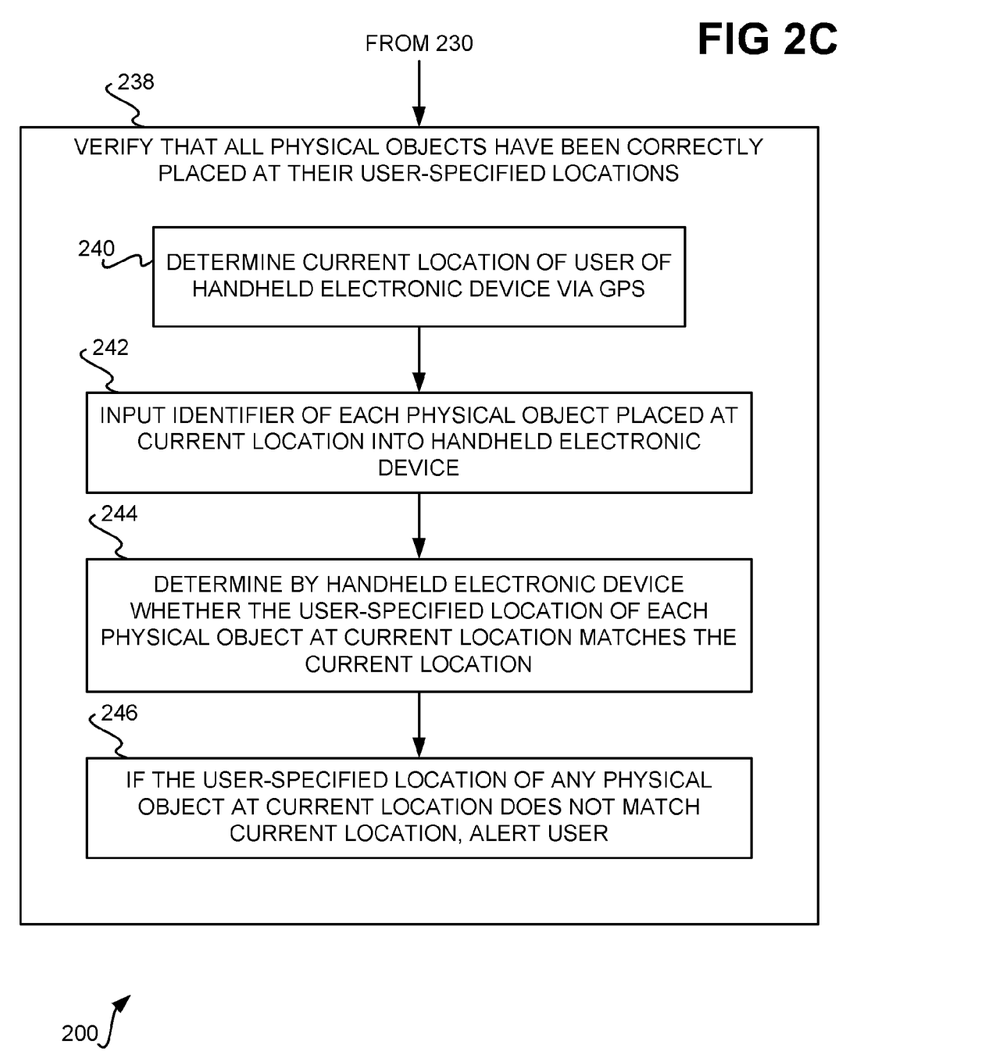

FIGS. 2A, 2B, and 2C show a method 200, according to an embodiment of the present invention. The dimensions of each physical object to be moved from an original physical site to a destination physical site are at least approximately determined (202). In one embodiment, a user may simply use a tape measure to measure the dimensions of each physical object, or otherwise manually measure the dimensions of each object. In another embodiment, a user may employ a three-dimensional object scanner that automatically approximately measures the dimensions of each physical object, without the user having to manually measure the dimensions him or herself.

Each physical object is further tagged with an identifier (204). For instance, a radio-frequency identification (RFID) tag may be attached to each physical object. The RFID tag attached to a physical object emits a radio signal corresponding to the identifier of the physical object. As another example, an optically scannable bar code may be affixed to or imprinted on each physical object. The bar code of a physical object encodes the identifier of the physical object. As a third example, simple stickers that have unique numbers printed on them may be attached to the objects. The number on the sticker affixed to a physical object represents the identifier of the physical object. It is noted that dimensions determination in part 202 and the identifier tagging in part 204 may be performed at the original physical site from which the objects are being moved.

The virtual layout of the destination physical site, as well as the dimensions and the identifiers of the physical objects, are input into a computer program (206). For instance, as to the virtual layout, a CAD file of the destination physical site may be specified and that the computer program in one embodiment reads to input the virtual layout of the destination physical site. As to the dimensions and the identifiers of the physical objects, input into the computer program may be achieved as follows.

First, the dimensions and the identifier of each physical object may be input into a handheld electronic device at the original physical site (208). For instance, if the handheld electronic device includes three-dimensional object scanning functionality and capability, then the dimensions of each physical object may be automatically input into electronic device. Otherwise, the dimensions of each physical object may be manually entered into the handheld electronic device. Furthermore, if the identifier of a physical object in question is part of an RFID tag or a bar code, the RFID tag may communicate the identifier automatically to the handheld electronic device or the bar code may be optically read or scanned by the electronic device.

In another embodiment, the dimensions of each physical object may be input via voice recognition. That is, a user may vocally speak the dimensions of each physical object, where the handheld electronic device employs voice recognition to translate the spoken utterances to data. It is further noted that the difference between part 208 and part 202 is that in the former, the dimensions of each physical object are determined, whereas in part 208 the dimensions of each physical object as has been determined in part 202 are input into a handheld electronic device. The dimensions and the identifier of each physical object are then electronically transmitted, in a wired or a wireless manner, from the handheld electronic device to the computing system on which the computer program is running (210).

For each physical object, a user-specified location of where within the destination physical site the physical object is to be placed when moved to the destination physical site, based on the virtual layout of the destination physical site and the dimensions and the identifiers of the physical objects, is input using the computer program (212). This is achieved in one embodiment by a user interacting with the computer program in question, as has been described in relation to FIG. 1. In one embodiment, a user interacts with a client computing device that communicates over a network with a server computing device on which the computer program is running. For instance, the user may interact with the computer program using an Internet web-browsing program to access the computer program in question over the Internet.

In one embodiment, the order in which the physical objects are to be loaded at the original physical site into the physical transporter for movement to the destination physical site is optimized (214). Such optimization may be based on the dimensions of each physical object and/or on the user-specified location of where within the destination physical site each physical object is to be placed. The optimization may satisfy one or more constraints. One example constraint is that the physical objects compactly fit into the physical transporter, so that space utilization within the transporter is maximized.

Another example constraint is that the physical objects are unloaded from the physical transporter at the destination physical site such that the physical objects to be placed at user-specified locations farther away from an entry point at this site are unloaded before the physical objects to be placed at user-specified locations closer to the entry point. For example, all the physical objects may have to be moved through a given door of the destination building. The physical objects may be loaded onto the physical transporter so that when they are unloaded at the destination building, the physical objects to be placed at locations farthest away from the given door are unloaded first, and the physical objects to be placed at locations closest to the given door are unloaded last.

The physical objects are thus loaded into the physical transporter at the original physical site (216), and are moved from the original physical site to the destination physical site via the physical transporter (218). At the destination physical site, each physical object is looked up using its identifier to determine the user-specified location where the physical object is to be placed (220). In one embodiment, determining the user-specified location as to where each physical is to be placed within the destination physical site is performed as follows.

The identifier of a physical object may be input into a handheld electronic device (222), such as the handheld electronic device that was earlier used at the original physical site. If the identifier of a physical object in question is part of an RFID tag or a bar code, the RFID tag may communicate the identifier automatically to the handheld electronic device or the bar code may be optically read or scanned by the electronic device. The handheld electronic device then looks up the user-specified location for the physical object using this identifier (224), and the user-specified location is displayed to the user on the electronic device (226). The handheld electronic device may store the user-specified locations for all the physical objects, as have been sent to the electronic device by the computer program, or the electronic device may wirelessly transmit the identifier of a physical object to the computer program and receive in return the user-specified location for the object having this identifier.

Each physical object is thus unloaded from the physical transporter and placed at its user-specified location (228). In one embodiment, it is verified that all physical objects that were previously tagged with identifiers have in fact been moved from the original physical site to the destination physical site (230). Such verification is achieved as follows in one embodiment.

First, the identifier of each physical object that has been moved to the destination physical site is input into a handheld electronic device (232), to yield a collection of identifiers of objects that have been moved to the destination physical site. The identifier input of part 232 is performed in one embodiment while the identifier of each physical object is input in part 222 to look up the user-specified locations of the objects. Then, for each physical object that was previously tagged with an identifier, the handheld electronic device determines whether the identifier is within this collection (234). If the identifier of any physical object that was tagged with an identifier is not within this collection, then this means that the object was not moved from the original physical site to the destination physical site, and the user of the handheld electronic device is alerted in one embodiment that one or more such objects are missing (236). Furthermore, physical objects may be detected at the destination physical site that were not previously tagged with identifiers at the original physical site. In this instance, such objects are further examined in one embodiment to determine whether they were incorrectly moved to the destination physical site, or were overlooked at the original physical site and not tagged at the original physical site.

In one embodiment, it is verified that all the physical objects have been correctly placed at their user-specified locations (238), as opposed to being placed at other locations at the destination physical site. That is, the verification of part 238 ensures that a desk intended for placement in the den, for example, was not incorrectly placed in a bedroom by mistake. The verification of part 238 compares in this way with the verification of part 230, which ensures that the desk was in fact moved from the original physical site to the destination physical site in the first place, regardless of whether the desk was correctly placed at the destination physical site.

Verification of correct placement in part 238 is achieved as follows in one embodiment. First, the current location of the user of a handheld electronic device is determined via a global-positioning system (GPS) capability or functionality of the electronic device (240). The current location may be determined as a particular latitude and longitude to some degree of precision, and may further be corresponded to a particular room within the destination physical site. In lieu of GPS, the current location of the user may be determined by the user simply specifying the room in which he or she is currently. The identifier of each physical object that has been placed at the current location is also input into the handheld electronic device (242), where such input may be accomplished as has been described in relation to part 222. The result of part 242 is a collection of physical objects that are at the current location, where this collection is not to be confused with the collection of identifiers described in relation to part 234 above.

The handheld electronic device determines whether the user-specified location of each physical object at the current location of the user matches the current location of the user as has been determined in part 240 (244). That is, the handheld electronic device determines whether each physical object within the collection resulting from part 242 has a user-specified location that matches the current location of the user. The user-specified location of each physical object may in one embodiment also be specified by latitude and longitude, or in another embodiment be specified as to a particular room. If the user-specified location of any physical object at the current location does not match the current location, the handheld electronic device may alert the user to this fact (246) so that the incorrectly placed furniture may be repositioned correctly.

For example, a user may step into the master bedroom at the destination physical location, and this current location of the user determined using the handheld electronic device. Each physical object within the master bedroom may have an RFID tag affixed to it that emits its identifier to the handheld electronic device. The handheld electronic device then determines in one embodiment whether each of these physical objects is supposed to be in the master bedroom, based on their user-specified locations. If any of the physical objects are not supposed to be in the master bedroom, the handheld electronic device notifies the user of this fact in one embodiment.

Figure 3:
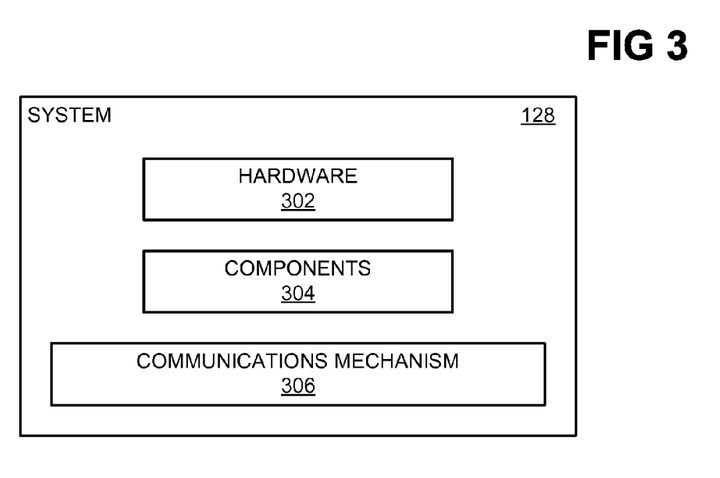
FIG. 3 is a diagram of a representative system, according to an embodiment of the present invention.

FIG. 3 shows a rudimentary implementation of the computing system 128 of FIG. 1 that has been described, according to an embodiment of the invention. The computing system 128 includes hardware 302 and components 304. The hardware 302 may be or include one or more processors, memory, storage devices, and other types of hardware typically found within a computing system, such as video cards, input devices, and so on. The components 304 are implemented within the hardware 302. For instance, the components 304 may be software running on the hardware 302. In this respect, the components 304 may be or include the computer program that has been described in relation to the method 200 of FIGS. 2A, 2B, and 2C.

The components 304 perform the functionality that has been ascribed to the computing system 128. For instance, the components 304 receive a virtual layout of a destination physical site to which physical objects are to be moved from an original physical site. The components 304 receive dimensions and an identifier for each object. The components 304 permit a user to input a user-specified location of where within the destination physical site each physical object is to be placed when moved to the destination physical site, based on the virtual layout and the dimensions and the identifiers of the physical objects. The components may further optimize the order in which the physical objects are loaded into a physical transporter for moving the physical objects from the original physical site to the destination physical site, as has been described.

The communications mechanism 306 is hardware that is specifically called out as separate than the hardware 302. As used generally in, the term mechanism relates to hardware, and the term component relates to software that is implemented via hardware. The communications mechanism 306 electronically, such as in a wired or a wireless manner, communicates with a handheld electronic device as has been described throughout the method 200 of FIGS. 2A, 2B, and 2C.

Figure 4:
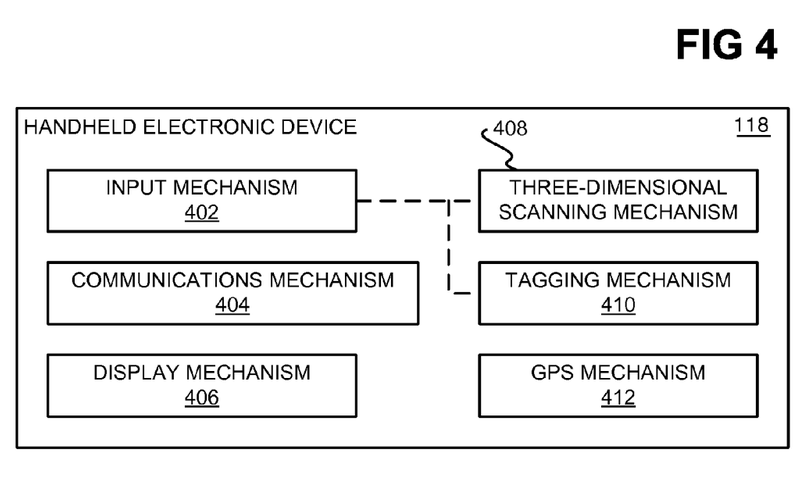
FIG. 4 is a diagram of a representative handheld electronic device, according to an embodiment of the present invention.

FIG. 4 shows a rudimentary implementation of the handheld electronic device 118 of FIG. 1 that has been described, according to an embodiment of the invention. The handheld electronic device in one embodiment includes an input mechanism 402, a communications mechanism 404, a display mechanism 406, a three-dimensional scanning mechanism 408, a tagging mechanism 410, and a GPS mechanism 412. Each of the mechanisms 402, 404, 406, 408, 410, and 412 is hardware.

The input mechanism 402 inputs dimensions and an identifier of each physical object to be moved from an original physical site to a destination physical site. For instance, the input mechanism 402 may include a three-dimensional scanning mechanism 408 that approximately determines or measures the dimensions of each such physical object without a user of the handheld electronic device 118 having to manually measure the dimensions of the physical object. The input mechanism 402 may include a tagging mechanism 410 to receive the identifier of each physical object with the user having to manually type in the identifier of the physical object.

For example, if the physical object is tagged with an RFID tag, the tagging mechanism 410 may include a receiver that receives the radio signal emitted by such an RFID tag and that corresponds to the identifier in question. As another example, if the physical object is tagged with an optically scannable bar code, the tagging mechanism 410 may include an optical reader that optically reads the bar encode which encodes the identifier in question. In such instance, the handheld electronic device 118 may include a printing mechanism as well, so that bar code labels are printed out by the device 118 in one embodiment and affixed to the physical objects at the original physical site, and so that receipts are printed in one embodiment at the destination physical site indicating which objects have been delivered. The input mechanism 402 may further or alternately include a mechanism by which a user may manually input information into the handheld electronic device 118, such as a physical keyboard, or a virtual keyboard implemented in relation to a touch-sensitive display.

The communications mechanism 404 electronically, in a wired or a wireless manner, communicates the dimensions and the identifier to the computing system 128. The display mechanism 406 displays the user-specified location of where to place each physical object within the destination physical site after the handheld electronic device 118 has looked up the physical object (via its identifier) to determine this location. The GPS mechanism 412 determines the current location of the user holding the handheld electronic device 118, within the destination physical site, as has been described. Thus, the identifier of each physical object at the current location is input in one embodiment into the handheld electronic device 118, to verify that the user-specified location of each physical object matches the user's current location. The handheld electronic device 118 in one embodiment performs the two verifications described in relation to parts 230 and 238 of the method 200 of FIGS. 2A, 2B, and 2C.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method comprising:
   prior to a person moving from an existing home to a new home,
      at least approximately determining dimensions of each physical object of a plurality of physical objects located in the existing home and belonging to the person, the physical objects to be moved to the new home;
      tagging each physical object with an identifier;
      inputting a virtual layout of the new home and the dimensions and the identifier of each physical object to a computer program;
      for each physical object, inputting a location specified by the person of where within the new home the physical object is to be placed when moved to the new home, based on the virtual layout of the new home and the dimensions and the identifier of each physical object, using the computer program; and
   after the physical objects have been transported from the existing home to the new home,
      at the new home, looking up each physical object using the identifier of the physical object to determine the location that the person specified of where the physical object is to be placed within the new home.

2. The method of claim 1, wherein at least approximately determining the dimensions of each physical object comprises using a three-dimensional scanner to approximately determining the dimensions of the physical object without a user having to manually measure the dimensions of the physical object.

3. The method of claim 1, wherein tagging each physical object with the identifier comprises attaching a radio-frequency identification (RFID) tag, the RFID tag emitting a radio signal corresponding to the identifier of the physical object.

4. The method of claim 1, wherein inputting the virtual layout of the new home into the computer program comprises specifying a computer-aided design (CAD) file of the new home for reading by the computer program.

5. The method of claim 1, wherein inputting the dimensions and the identifier of each physical object into the computer program comprises:
   at the existing home, inputting the dimensions and the identifier of each physical object into a handheld electronic device; and,
   transmitting the dimensions and the identifier of each physical object from the handheld electronic device to the computer program.

6. The method of claim 1, wherein, for each physical object, inputting the location of where within the new home the physical object is to be placed when moved to the new home comprises the person interacting with a virtual worlds environment using a first computing device communicating over a network with a second computing device on which the computer program is running.

7. The method of claim 1, wherein, at the new home, looking up each physical object using the identifier of the physical object to determine the location of where to place the physical object within the new home comprises, for each physical object:
   inputting the identifier of the physical object into a handheld electronic device;
   looking up the location of where to place the physical object within the new home by the handheld electronic device, using the identifier of the physical object; and,
   displaying the location of where to place the physical object within the new home by the handheld electronic device to a mover.

8. The method of claim 7, further comprising, at the new home, after looking up each physical object to determine the location of where to place the physical object within the new home, placing the physical object at the location within the new home, by the mover.

9. The method of claim 8, further comprising, at the new home, verifying that all the physical objects have been correctly placed at the locations for the physical objects within the new home.

10. The method of claim 9, wherein verifying that all the physical objects have been correctly placed at the locations for the physical objects within the new home comprises:
    determining a current location of a user of a handheld electronic device within the new home by using global-positioning system (GPS) capabilities of the handheld electronic device;
    inputting the identifier of each physical object placed at the current location of the user into the handheld electronic device to yield a collection of one or more physical objects placed at the current location;
    determining by the handheld electronic device that the location of each physical object within the collection matches the current location of the user; and,
    where the location of any physical object of the collection does not match the current location of the user, alerting the user by the handheld electronic device.

11. The method of claim 1, further comprising verifying that all the physical objects have been moved from the existing home to the new home.

12. The method of claim 1, wherein verifying that all the physical objects have been moved from the existing home to the new home comprises:
    inputting the identifier of each physical object that has been moved to the new home into a handheld electronic device to yield a collection of identifiers of one or more objects that have been moved to the new home;
    for each physical object that was previously tagged with an identifier, determining by handheld electronic device whether the identifier of the physical object is within the collection; and,
    where the identifier of any physical object is not within the collection, alerting a user by the handheld electronic device.

13. The method of claim 1, further comprising optimizing an order in which the physical objects are to be loaded into a physical transporter for moving the physical objects from the existing home to the new home based on one or more of:
    the dimensions of each physical object; and, the location of where within the new home each physical object is to be placed.

14. The method of claim 13, wherein optimizing the order in which the physical objects are to be loaded into the physical transporter at least substantially satisfies one or more constraints, the constraints comprising one or more of:
   the physical objects compactly and/or economically fitting into the physical transporter; and,
   the physical objects being unloaded from the physical transporter at the new home so that the physical objects to be placed at locations farther away from an entry point at the new home are unloaded before the physical objects to be placed at locations closer to the entry point.

15. A method comprising:
   prior to a worker moving from an existing office location to a new office location,
      at least approximately determining dimensions of each physical object of a plurality of physical objects located in the existing office location and belonging to or used by the worker, the physical objects to be moved to the new office location;
      tagging each physical object with an identifier;
      inputting a virtual layout of the new office location and the dimensions and the identifier of each physical object to a computer program;
      for each physical object, inputting a location specified by the worker of where within the new office location the physical object is to be placed when moved to the new office location, based on the virtual layout of the new home and the dimensions and the identifier of each physical object, using the computer program; and
   after the physical objects have been transported from the existing office location to the new office location,
      at the new office location, looking up each physical object using the identifier of the physical object to determine the location that the worker specified of where the physical object is to be placed within the new office location.

16. A method comprising:
   prior to a military personnel moving from an existing military location to a new military location,
      at least approximately determining dimensions of each physical object of a plurality of physical objects located in the existing military location and belonging to, used by, or under the responsibility of the military personnel, the physical objects to be moved to the new military location;
      tagging each physical object with an identifier;
      inputting a virtual layout of the new military location and the dimensions and the identifier of each physical object to a computer program;
      for each physical object, inputting a location specified by the military personnel of where within the new military location the physical object is to be placed when moved to the new military location, based on the virtual layout of the new home and the dimensions and the identifier of each physical object, using the computer program; and
   after the physical objects have been transported from the existing military location to the new military location,
      at the new military location, looking up each physical object using the identifier of the physical object to determine the location that the military personnel specified of where the physical object is to be placed within the new military location.

* * * * *